(12) United States Patent
Puttmann

(10) Patent No.: US 7,052,049 B2
(45) Date of Patent: May 30, 2006

(54) ROD LINKAGE

(75) Inventor: Franz-Josef Puttmann, Lennestadt (DE)

(73) Assignee: Tracto-Technik GmbH (DE)

( * ) Notice: Subject to any disclaimer, the term of this patent is extended or adjusted under 35 U.S.C. 154(b) by 6 days.

(21) Appl. No.: 10/465,952

(22) PCT Filed: Dec. 13, 2001

(86) PCT No.: PCT/EP01/14674

§ 371 (c)(1),
(2), (4) Date: Oct. 23, 2003

(87) PCT Pub. No.: WO02/053870

PCT Pub. Date: Jul. 11, 2002

(65) Prior Publication Data

US 2004/0071497 A1   Apr. 15, 2004

(30) Foreign Application Priority Data

Dec. 29, 2000  (DE) ................. 100 65 533

(51) Int. Cl.
F16L 27/00 (2006.01)

(52) U.S. Cl. .................. 285/147.1; 285/282; 285/68

(58) Field of Classification Search .......... 285/147.1, 285/148.1, 144.1, 273, 282, 272, 279, 147.2, 285/68, 69

See application file for complete search history.

(56) References Cited

U.S. PATENT DOCUMENTS

| 442,809 | A | * | 12/1890 | Hunter | 285/282 |
| 757,493 | A | * | 4/1904 | Pettingell | 285/272 |
| 804,304 | A | * | 11/1905 | Coppersmith | 285/279 |
| 949,300 | A | | 2/1910 | Massa | |
| 1,551,332 | A | * | 8/1925 | Schramm | 285/282 |
| 2,729,473 | A | * | 1/1956 | Warshawsky | 285/282 |
| 2,845,091 | A | * | 7/1958 | Neer | 285/68 |
| 3,030,128 | A | * | 4/1962 | Versen | 285/282 |
| 3,893,630 | A | * | 7/1975 | Bochmann et al. | 285/273 |
| 4,008,910 | A | * | 2/1977 | Roche | 285/282 |
| 5,007,762 | A | | 4/1991 | Duran | |
| 5,172,942 | A | | 12/1992 | Dillmann | |
| 5,980,157 | A | * | 11/1999 | Puttman | 405/184 |
| 6,120,064 | A | * | 9/2000 | McNamara | 285/38 |

FOREIGN PATENT DOCUMENTS

| DE | PS - 61 608 | 3/1892 |
| DE | 23 31 655 A1 | 1/1975 |
| DE | 297 13 354 | 2/1999 |
| DE | 199 18 530 A1 | 10/2000 |
| WO | PCT/EP01/14674 | 5/2002 |
| WO | PCT/EP01/14674 | 3/2003 |

* cited by examiner

Primary Examiner—David Bochna
(74) Attorney, Agent, or Firm—Cook, Alex, McFarron, Manzo, Cummings & Mehler, Ltd.

(57) ABSTRACT

Rod linkage for rod segments for a horizontal earth drill, whereby the rod segment ends can be interconnected by displacing the rod segment axes in parallel. The invention relates to a rod linkage for horizontal earth drilling which is characterized in that the ends of the rod segments can be interconnected by displacing the rod segment axes in parallel.

11 Claims, 5 Drawing Sheets

ROD LINKAGE

Figure 1:
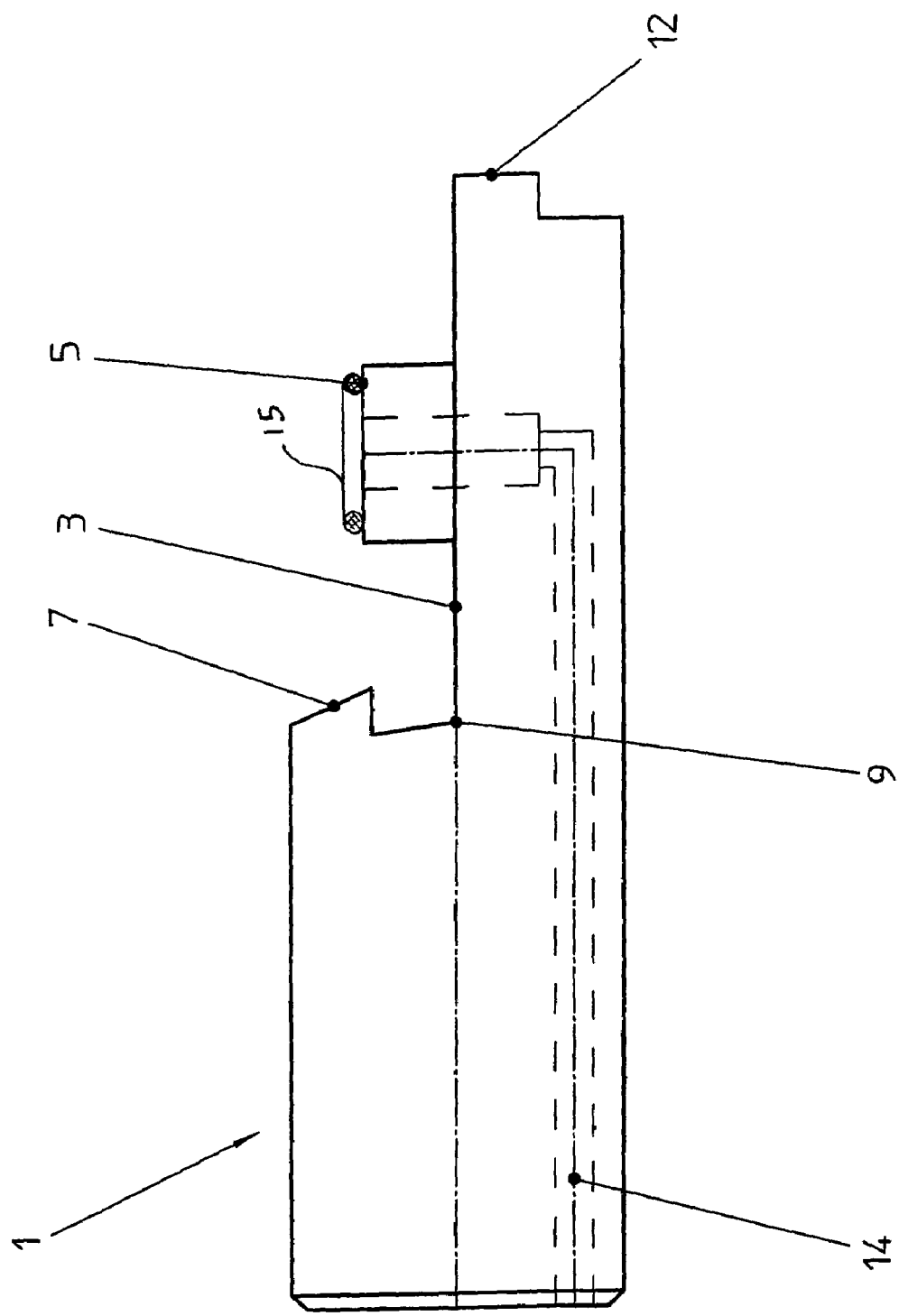

The invention relates to a rod linkage, as it is commonly used to interconnect pipes in horizontal earth drilling and trenchless installation and replacement of pipe conduits (in the following designated as "horizontal drilling"). The invention claims the priority of German patent application 100 65 533.5, the content of which is taken into reference.

In horizontal drilling, single rod segments are aligned, interconnected and moved though the soil by means of thrust drives, pulling drives and/or rotational drives. In case of longer borings, the rod consists of several rod segments, which are one by one interconnected or detached from each other in dependence of the drill feed. The single rod segment is of limited length and has to be particularly short, if the drilling process starts from a narrow boring pit, e.g. from a manhole. The latter partly may have diameters of less than one meter.

Linkage means of different construction types are available in order to interconnect these rod segments, whereof the threaded coupling constitutes a commonly used linkage type. Besides the problem, that screwing up these threaded couplings is rather time-consuming and requires clean threads—what is especially difficult to realise at building sites—these couplings also have the particular disadvantage, that they allow pipe rotation in a forward drilling situation in just one direction. In case of a threaded coupling with a right-hand thread, only clockwise rotation of the is allowed, since the coupling would otherwise be released during the drilling process. However, a drive rotation in both directions of rotation is particularly important in case of using asymmetrical bore heads.

A rod linkage, which abandons the common threaded couplings is known from the DE 199 18 530 A1. To allow a connection between two rod segments, which provides a sufficient torsional and tensile strength, this linkage employs a strap-like axial projection at the front end of the rod section to be connected, whereby this projection slidingly engages with the rear end of the proceeding rod segment. To this aim, the proceeding rod segment at its front provides an axial slit with a groove, into which the strap-like projection can be inserted. Thereby, a peg-like protruding element is introduced via the groove into a bearing hole of the slit. By rotating the following rod section to 90°, this element is transferred from the angular retracted position of insertion into a stretched position, after which it extends co-axially to the proceeding rod section.

This connection has the disadvantage, that it requires a complex construction procedure, which is unpractical in respect to the requirements at a building site, especially if the threaded coupling is intended to be traversed by a fluid conduit. To realise such a conduit, a sealing socket, which is impinged on by means of a pressure spring, is arranged in the fluid channel of the proceeding pipe. This sealing socket with a fore-part being averted from the pressure spring fits in a sealing manner to the rounded fore-part of the strap positioned at the shoulder of the other engaging rod segment, which is also provided with an axial bore. The axial bores of the rod segments join into a coaxial position not before the stretching position is reached, thereby creating a continuous feed line. This construct also bears the risk of leakage.

The DE 297 13 354 U1 discloses a rod linkage, in which a first coupling element is introduced into a second coupling element, followed by securing the construct against relative radial movement by means of a retainer element in the form of a retainer bushing. In order to connect the pipe elements according to the teaching of the utility model, the first coupling element with its free leading end is introduced from above into a groove-like receptacle of the second coupling element, whereby the first coupling element is in an angle of about 60° relative to the longitudinal axis of the second coupling element. Thereby, hemispherical projections of the first coupling element join with recesses of the second coupling element.

Starting from this position, in which the two rod ends are in angular orientation to each other, the first coupling element and the recesses are rotated, such that the first coupling element enters into the groove-like receptacle of the second coupling element, where it is received in tight fit.

The handling of this coupling is troublesome and especially problematic in narrow boring pits.

Starting from this background, the invention has the objective to provide a rod linkage for horizontal drilling, which can be quickly and easily handled and only requires little space. Likewise, a corresponding method for interconnecting rod segments shall be provided.

This objective is achieved by a rod linkage and a method according to the independent claims. Advantageous embodiments are subject of the respective dependent claims.

Essentially, the invention is based on the principle to connect rod segments that way, that the respective ends of the rod segments are designed such, that they can be interconnected by parallel displacement of the rod segment axes, whereby the rod segment axes preferably show an angle of $\alpha<180°$ to each other.

It is particularly advantageous to design the rod segment ends as corresponding coupling faces, which can be interconnected by different connecting means.

For purposes of power transmission, one of the coupling faces can be provided with a peg, which engages with a corresponding recess of the other coupling face.

A safety device against radial movement of the rod segments to each other is not necessarily obligate during operation, since such movement is prevented to a certain degree by the walls of the bore hole.

If it is nevertheless desired to incorporate a safety device against radial movement of the rod segments, at least one of the fore-parts of the rod ends can be provided with an undercut, in which a projection of the following coupling face an engage. In this case, the following rod segment with its coupling face is joined laterally to the preceding linkage section at an angle $\alpha<180°$ followed by rotating the projection of the coupling face into place in the undercut of the preceding fore-part. Thereby, the rod linkage is already secured against axial dislocation during the coupling process and secured against radial dislocation after the rotation into place has been accomplished.

This offers the advantage, that the rod segments already are connected in a manner providing rotational resistance, when they have not even arrived at the coaxial stretching position. Therefore, the rod segments can be joined to each other in a variable angle, which is only limited by the stretching position and the lateral joining position. This allows to "thread-up" the rod segments, which are coupled in a manner according to the invention, also in narrow pits, if they have already been joined above-ground.

The projection engaging with the undercut can be advantageously designed with asymmetrical edges. Whereas one edge can e.g. be arc-shaped, the other may provide a stopping element. The arc-shaped area allows a rotation into place in the undercut, whereas the stopping edge impacts at the undercut, thus blocking a distortion of the following rod segment beyond the stretching position.

Additional locking means are possible besides a locking means based on a projection engaging with an undercut of the fore-part. For example the end of the coupling face of the following rod may exhibit one or several pins, which are acted upon by a spring, whereby these pins engage with a receptacle at the fore-part of the following rod end.

In a particularly advantageous embodiment, an axial channel for feed media like e.g. drilling fluid, hydraulic media or pressurised air, but also for an electric supply may traverse the rod linkage. This channel in the area of the coupling ends preferably emerges with an angle to the axial rod vector. Thereby, it may continue within the coupling means, e.g. a peg, in order to thus create the connection via the axis for rotating into place.

To this aim, it is advantageous to isolate the peg towards the corresponding recesses by gasket elements, e.g. by an O-ring.

The rod linkage according to the invention—in particular in combination with a locking means against axial shift—can be employed both in rotating rods, pushing rods and pulling rods or in a drive provided with striking means. Likewise, an employment in berstlining is possible. These different approaches for the installation and replacement of subterranean conduits are herein generally termed as horizontal earth drilling without thereby restricting the invention to the employment in one specific method.

In case of being employed also in drilling processes, which are driven by striking means, the fore-parts of the proceeding rod ends and possibly also the ends of the following coupling faces may be provided with damper elements.

Figure 2:
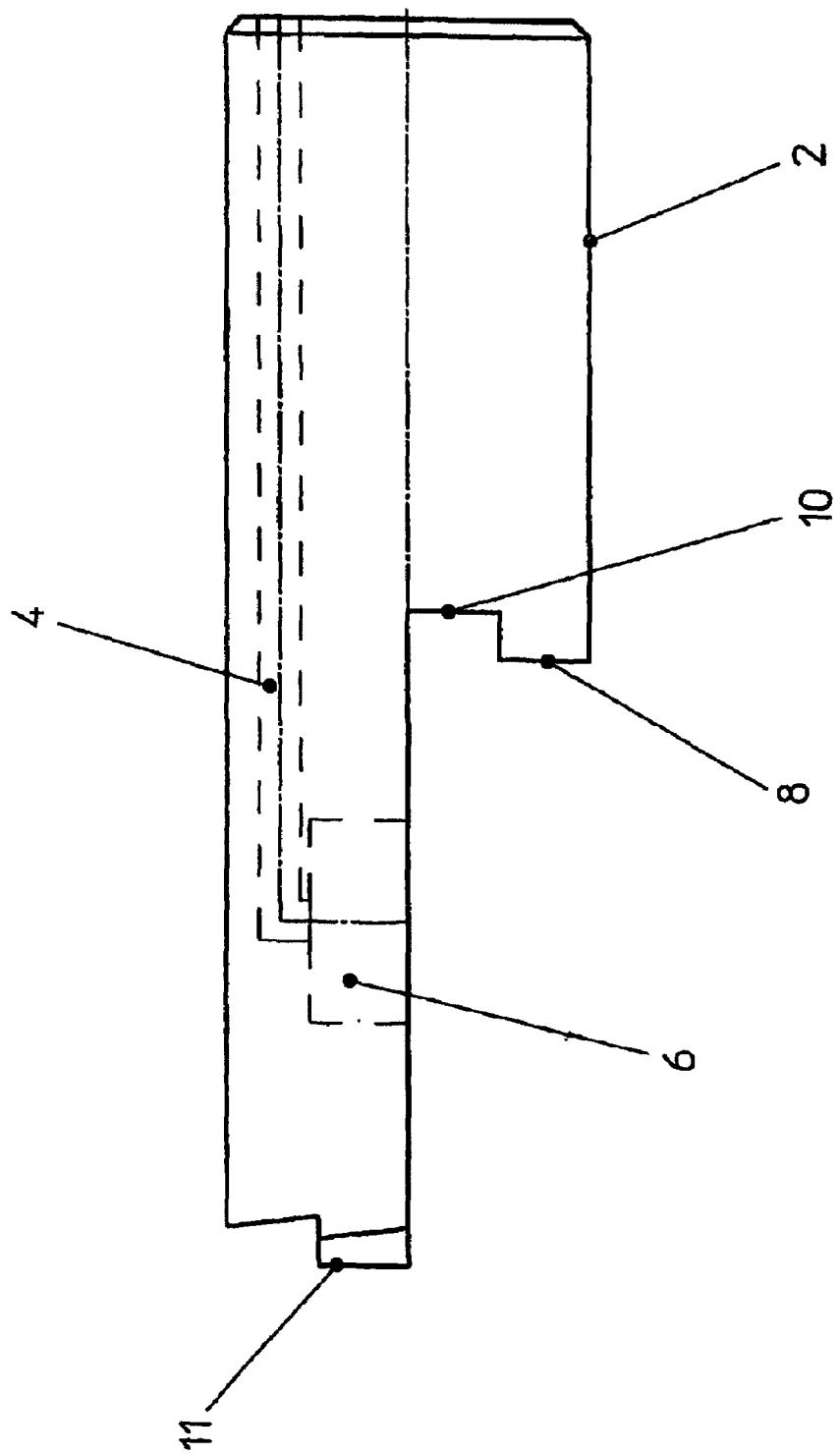
Figure 3:
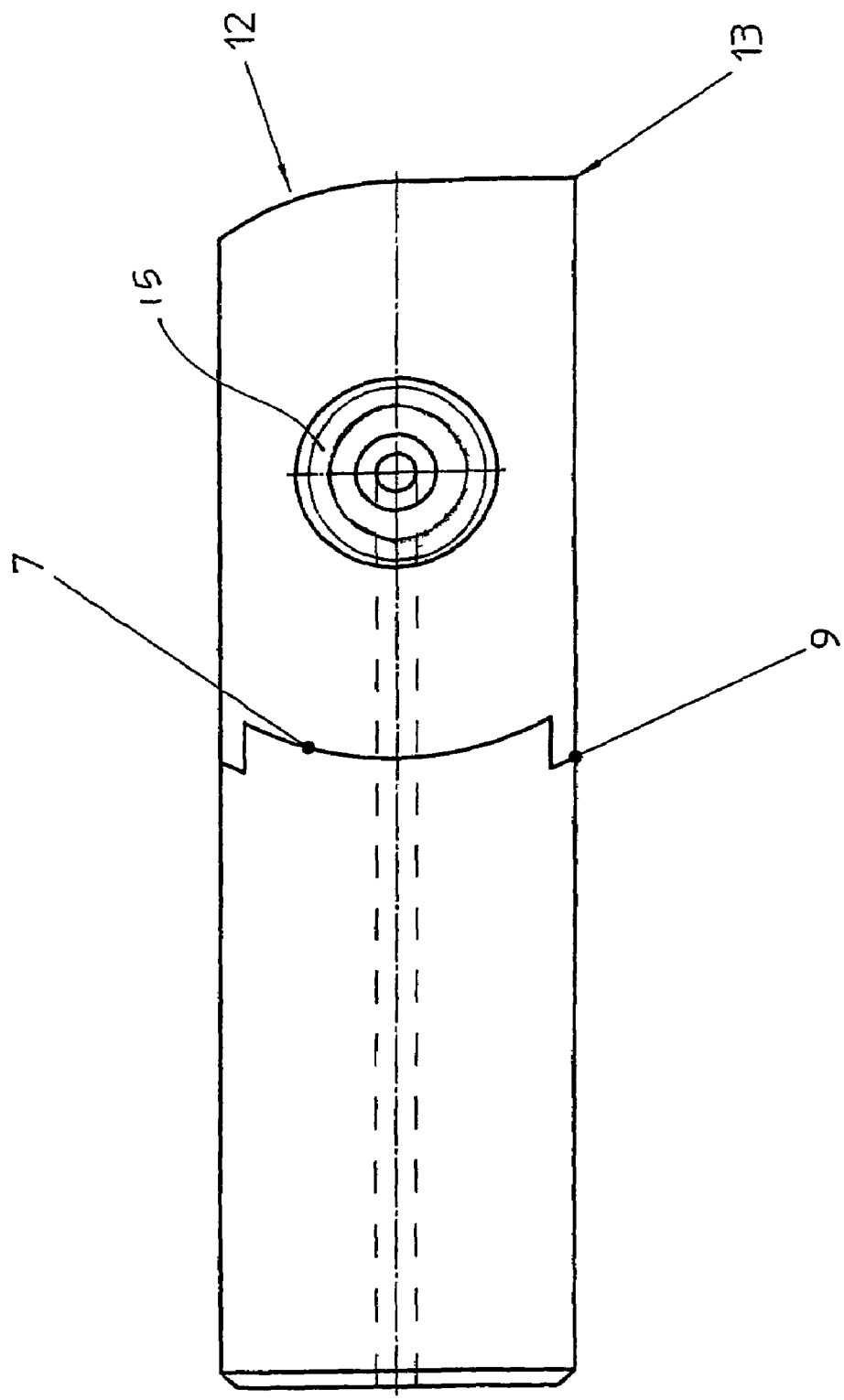
Figure 4:
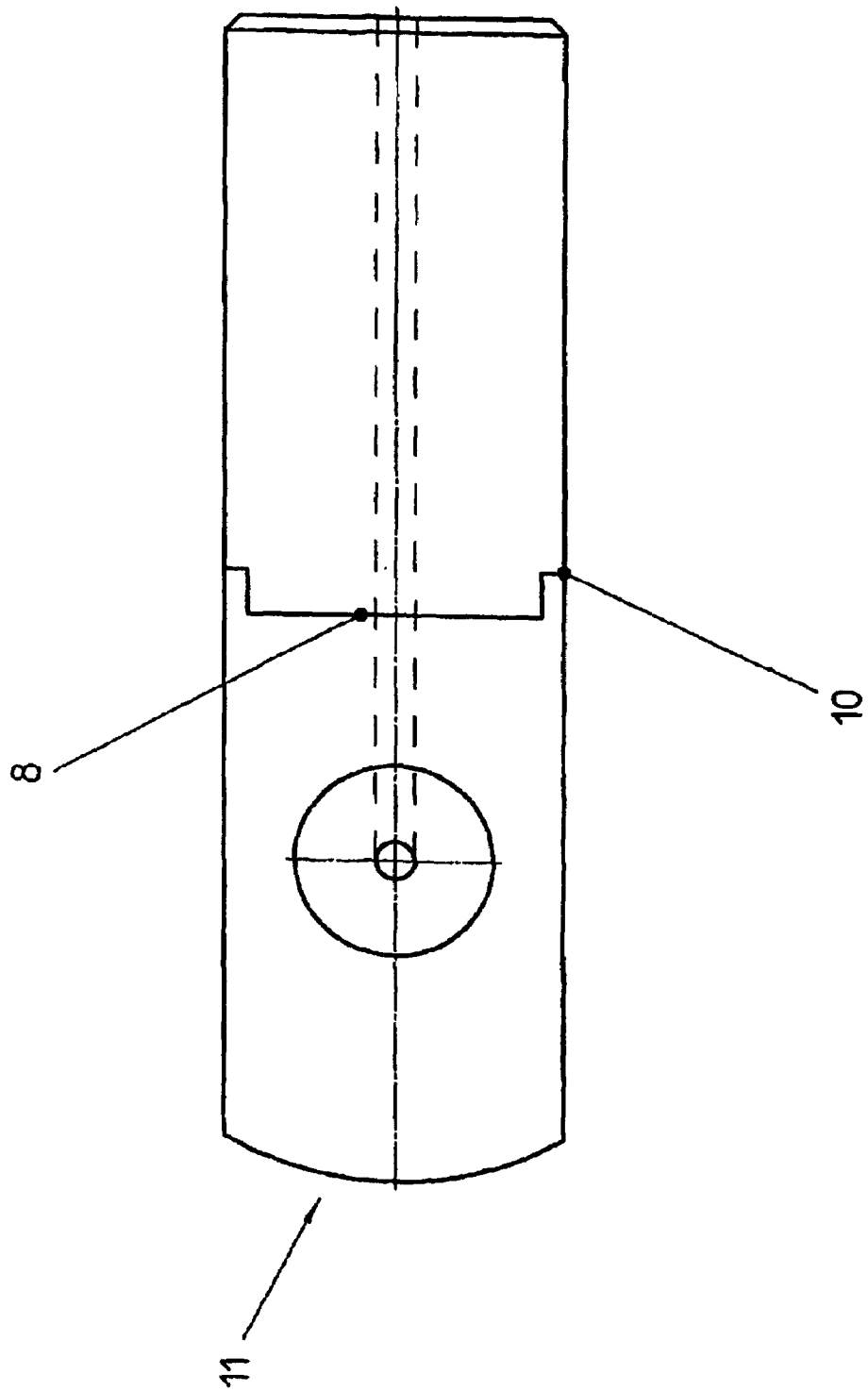
Figure 5:
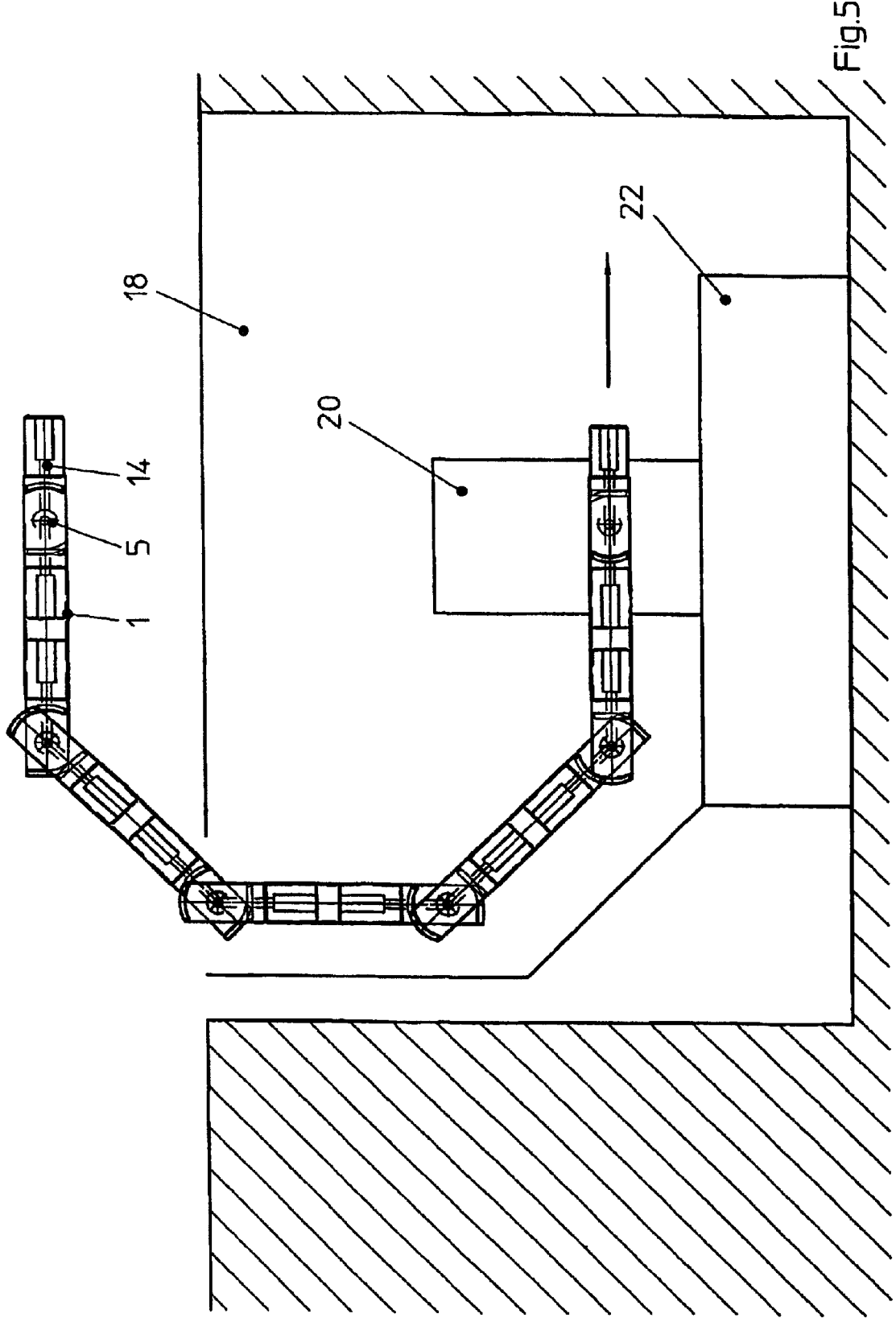

In the following, the invention is further explained by means of an example depicted in the drawings:

These drawings show:

FIG. 1 a side view of a proceeding rod end
FIG. 2 a side view of a following rod end
FIG. 3 a top view of a proceeding rod end
FIG. 4 a top view of a following rod end
FIG. 5 presentation of a rod with the linkage according to the invention in its position in the boring pit The rod linkage is comprised of a first linkage member 1 and a second linkage member 2. These members provide a respective coupling face 3 and 4, whereby the coupling face 3 carries a locking means in the form of a peg 5. The peg 5 corresponds to the recess 6 of the coupling face 4.

At the base of the coupling faces 3, 4, the linkage members 1, 2 comprise a respective rear fore-part 7, 8. These fore-parts provide a respective undercut 9, 10. A projection 11 in the front part of the coupling face 4 of the second linkage member corresponds with the undercut 9 of the first linkage member 1, whereas the projection 12 of the front part of coupling face 3 of the first linkage member corresponds with the undercut 10 of the second linkage member.

The projection 12 has an asymmetrical design, in that it possesses a stopping edge 13, which impacts at the undercut 10 after the second linkage member 2 has rotated into place, thus preventing a distorting rotation of the linkage member 2.

The rods are traversed by a medium channel 14, which in the area of the linkage members 1, 2 passes eccentrically to the rod's longitudinal axis. It exits through the peg 5 in the area of the coupling face 4, thereby leaving the rod axis vector in an angle of 90°, i.e. it rotates transversally to the longitudinal rod segment axis, thereby forming a medium channel exit axis. After having passed the connective means 5, 6 it returns to a path being in parallel to the rod axis. Thus the medium channel 14 crosses the rods in the area of the linkage members 1, 2 with a displacement in parallel.

FIG. 5 shows the rod according to the invention in combination with a drive 20 on a mounting 22 in a small pit 18.

The invention claimed is:

1. An assembly of two segments of a drilling rod and a rod linkage for connecting the drilling rod segments, whereby the rod linkage provides locking means for interconnecting the rod segments by a parallel displacement of at least one of the rod segment axes until their intersection, wherein the rod segments provide an internal bore for a drilling medium which also traverses the locking means, whereby the internal bore within the locking means is not coaxial to the rod axis, characterized in that the rod segments have damper elements, said damper elements exerting a pre-tension on the rod linkage.

2. The assembly according to claim 1, characterized in that the rod segments can be interconnected, if the segment axes enclose an angle of less than 180°.

3. The assembly according to claim 1, characterized in that the ends of the rod segments each have a coupling face, which correspond to each other.

4. The assembly according to claim 3, characterized in that one of said coupling faces provides a peg engaging with a corresponding receiver of the other of said coupling faces, thereby forming the locking means.

5. The assembly according to claim 4, characterized in that the peg is rotatably held within the receiver.

6. The assembly according to claim 3, characterized in that the locking means and/or further locking means, interconnect the coupling faces in a rotation resistant manner.

7. The assembly according to claim 6, characterized by at least one undercut at one end of the first rod segment, in which a corresponding projection at the end of the second segment can be rotated into place, thereby forming the further locking means that interconnect the coupling faces in a rotation resistant manner.

8. The assembly according to claim 7, characterized by at least one arc-shaped projection as part of the further locking means that interconnect the coupling faces in a rotation resistant manner.

9. The assembly according to claim 7, characterized by at least one stopping edge as part of the further locking means that interconnect the coupling faces in a rotation resistant manner.

10. The assembly according to claim 1, characterized by an angle of 90° between the internal bore with the locking means and the rod axis.

11. The assembly according to claim 1, characterized by a gasket element, which isolates the locking means.

* * * * *